US006159387A

United States Patent [19]

Mou et al.

[11] Patent Number: 6,159,387

[45] Date of Patent: Dec. 12, 2000

[54] MANUFACTURING PROCESS AND STRUCTURE OF INK JET PRINTHEAD

[75] Inventors: Tse-Chi Mou; Yee-Shyi Chang; Arnold Chang-Mou Yang; Chin-Yi Chou; Kou-Yow Tseng; Ying-Lun Chang; Shiang-Ching Cheng; Hung-Chun Tsai, all of Hsinchu, Taiwan

[73] Assignee: Microjet Technology Co., Inc., Hsinchu, Taiwan

[21] Appl. No.: 08/972,528

[22] Filed: Nov. 18, 1997

[51] Int. Cl.[7] .............................. B41J 2/05; G01D 15/18

[52] U.S. Cl. ................................................ 216/27; 347/63

[58] Field of Search ................................ 216/27; 347/63

[56] References Cited

U.S. PATENT DOCUMENTS 4,206,541 6/1980 Marciniec ................................ 216/27

5,122,812 6/1992 Hess et al. ................................ 347/63

*Primary Examiner*—Randy Gulakowski

*Assistant Examiner*—Shamim Ahmed

[57] ABSTRACT

A manufacturing process and a structure for an ink jet printhead with high quality, yield rate, and performance are provided. The process includes steps of: a) providing a substrate, b) forming a dielectric layer over the substrate, c) forming a resistor over the dielectric layer, d) forming a conducting layer over a portion of the resistor, e) forming a passivation over a portion of the conducting layer and another portion of the resistor not covered by the conducting layer, f) forming a hole over the passivation for storing an ink, and g) forming a nozzle over the hole for ejecting therethrough the ink.

19 Claims, 6 Drawing Sheets

MANUFACTURING PROCESS AND STRUCTURE OF INK JET PRINTHEAD

FIELD OF THE INVENTION

The present invention is related to a manufacturing process and structure of an ink jet printhead, and especially to an improved manufacturing process and structure of an ink jet printhead with high quality, yield rate, and performance.

BACKGROUND OF THE INVENTION

Generally, the bubble ink jet printhead ejects ink through a nozzle by using resistor device to boil the ink. During the process for manufacturing the conventional ink jet printhead, some toxic gas is generated and some operational difficulties reduce the yield rate. In addition, the conventional ink jet printhead has a shorter lifetime resulting from the overall structure problem.

In order to understand the conventional process for manufacturing the conventional ink jet printhead, please refer to FIG. 1. A silicon dioxide layer 12 is formed on a silicon substrate 11 by thermal oxidation and a resistor 13 (e.g. tantalum-aluminum alloy) is formed on the silicon dioxide layer 12 through a sputtering process. Thereafter, an aluminum-conducting layer 14 is formed on a portion of the resistor 13 by sputtering process and then a passivation 15 is formed over the conducting layer 12 and the resistor 13, not covered by the conducting layer 14, by plasma enhanced chemical vapor deposition (PECVD). The passivation 15 is a silicon nitride ($Si_3N_4$)/silicon carbide (SiC) layer. Finally, an isolator 16 is formed on the passivation 15 and then a nozzle plate 17 is stuck on the isolator 16 by an adhesive agent.

In the conventional process, the resistor 13 is usually made of tantalum-aluminum alloy. Because the tantalum-aluminum alloy is a material with high resistance, a phenomenon of electron migration will be generated when a current passes through the resistor and is accumulated to cause the resistor at a high temperature so that the useful lifetime of the ink jet printhead is reduced. In addition, there are some toxic gas generated during the process for forming the silicon nitride ($Si_3N_4$)/silicon carbide (SiC) layer by PECVD. Therefore, an object of the present invention is to provide an improved process for manufacturing the ink jet printhead to avoid the above described defects of the conventional process.

SUMMARY OF THE INVENTION

An object of the present invention is to provide a manufacturing process and structure of an ink jet printhead with low resistance in order to prolong the lifetime of the ink jet printhead and to avoid generating toxic gas upon manufacturing.

According to the present invention, the process includes steps of: a) providing a substrate; b) forming a dielectric layer over the substrate; c) forming a resistor over the dielectric layer and forming a doping resistor layer after the resistor is doped through a doping drive-in procedure; d) forming a conducting layer over a portion of the resistor; e) forming a passivation over a portion of the conducting layer and another portion of the resistor not covered by the conducting layer; f) forming a hole over the passivation for storing an ink; and g) forming a nozzle over the hole for ejecting therethrough the ink.

In accordance with one aspect of the present invention, the dielectric layer is formed by thermal oxidation.

In accordance with another aspect of the present invention, the dielectric layer is a silicon dioxide layer.

In accordance with another aspect of the present invention, the resistor is a tantalum nitride (TaN) layer.

In accordance with another aspect of the present invention, the doping drive-in procedure is a diffusion method or ion implantation.

In accordance with another aspect of the present invention, the doping drive-in procedure uses an element with an atomic radius which is 10~30% of that of tantalum as a dopant source.

In accordance with another aspect of the present invention, the doping resistor layer is a metal layer containing an element selected from a group consisting of tantalum (Ta), indium (In), lead (Pb), praseodymium (Pr), and samarium (Sm).

In accordance with another aspect of the present invention, the conducting layer is formed by sputtering process, photolithography, and etching technique.

In accordance with another aspect of the present invention, the conducting layer is an aluminum metal layer.

In accordance with another aspect of the present invention, the passivation is formed by plasma enhanced chemical vapor deposition (PECVD) or direct current (DC) sputtering technique.

In accordance with another aspect of the present invention, the passivation is a silicon nitride layer.

In accordance with another aspect of the present invention, after the step (e), the process further includes a step for forming a metal layer over another portion of the conducting layer not covered by the passivation.

In accordance with another aspect of the present invention, the metal layer is a gold (Au) metal layer formed by sputtering process.

In accordance with another aspect of the present invention, the hole is defined by forming a photoresist over a portion of the passivation.

In accordance with another aspect of the present invention, the nozzle is formed by using a nozzle plate attached to the photoresist.

Another object of the present invention is to provide a preferable process for manufacturing an ink jet printhead.

In the preferred embodiment of the present invention, the process includes steps of: a) providing a substrate; b) forming a dielectric layer over the substrate; c) forming a first resistor over the dielectric layer; d) forming a doping layer over the first resistor; e) forming a second resistor over the doping layer; f) forming a resistor layer after the doping layer is diffused to the first and second resistors; g) forming a conducting layer over a portion of the resistor layer; h) forming a passivation over a portion of the conducting layer and another portion of the resistor layer not covered by the conducting layer; i) forming a hole over the passivation for storing an ink; and j) forming a nozzle over the hole for ejecting therethrough the ink.

In accordance with one aspect of the present invention, the first resistor is a tantalum nitride (TaN) layer formed by direct current (DC) sputtering technique.

In accordance with another aspect of the present invention, the doping layer contains an element with an atomic radius which is 10~30% of that of tantalum.

In accordance with another aspect of the present invention, the doping layer is formed by direct current (DC) sputtering technique.

In accordance with another aspect of the present invention, the doping layer is a metal layer containing an element selected from a group consisting of indium (In), lead (Pb), praseodymium (Pr), and samarium (Sm).

In accordance with another aspect of the present invention, the second resistor is a tantalum nitride (TaN) layer formed by direct current (DC) sputtering technique.

In accordance with another aspect of the present invention, the resistor layer is formed through a rapid thermal process (RTP).

Another object of the present invention is to provide a structure of an ink jet printhead.

The structure according to the present invention includes: 1) a substrate; 2) a dielectric layer formed on the substrate; 3) a resistor formed on the dielectric layer; 4) a conducting layer formed over a portion of the resistor; 5) a passivation formed over a portion of the conducting layer and another portion of the resistor not covered by the conducting layer; 6) a photoresist formed over a portion of the passivation for providing a hole to store an ink therein; a metal layer formed over another portion of the conducting layer not covered by the passivation; and a nozzle plate positioned over the passivation for providing at least a nozzle corresponding to the hole to eject the ink.

The present invention may best be understood through the following description with reference to the accompanying drawings, in which:

DETAILED DESCRIPTION OF THE PREFERRED EMBODIMENT

Figure 1:
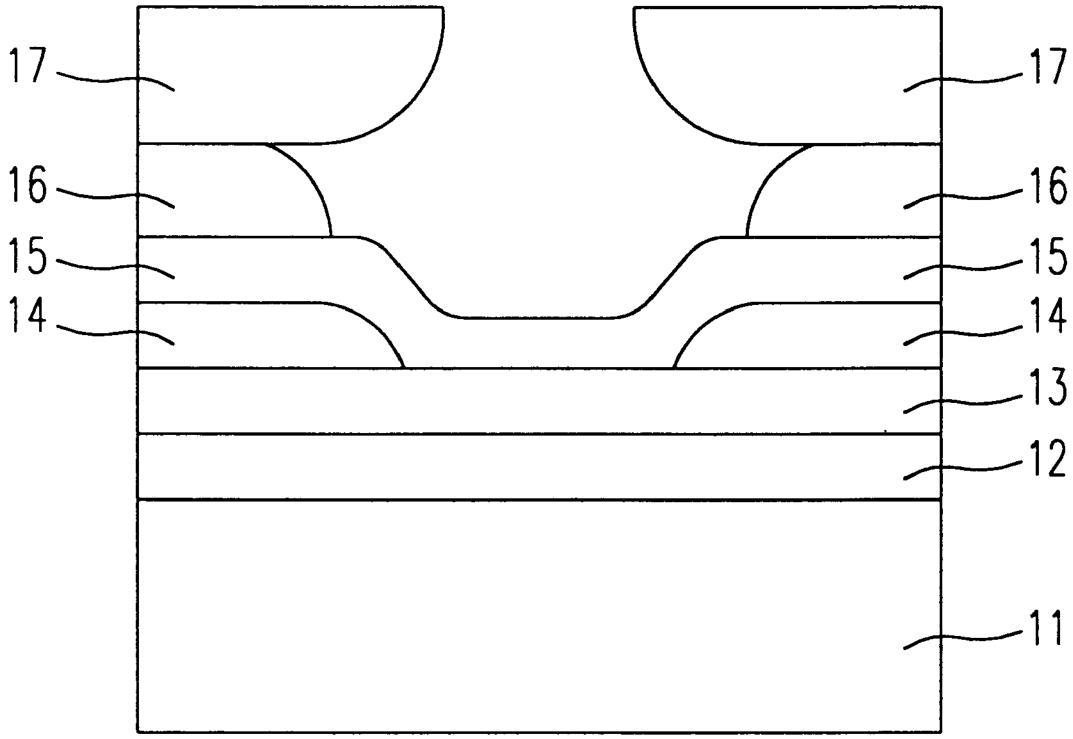
FIG. 1 is a schematic diagram showing the conventional ink jet printhead.
Figure 2A:
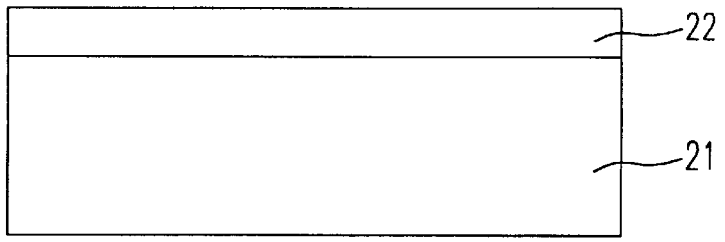
FIG. 2(*a*)~(*f*) are schematic diagrams showing a preferred embodiment of the processes for manufacturing an ink jet printhead according to the present invention.
Figure 2B:
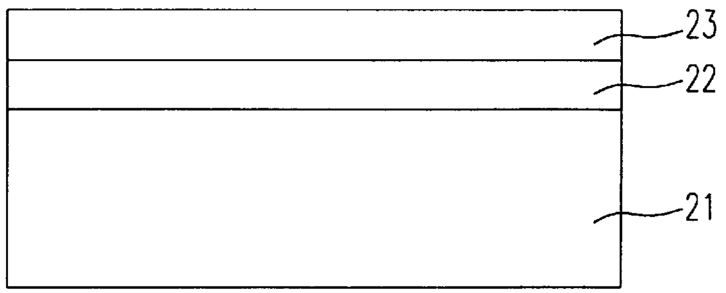
Figure 2C:
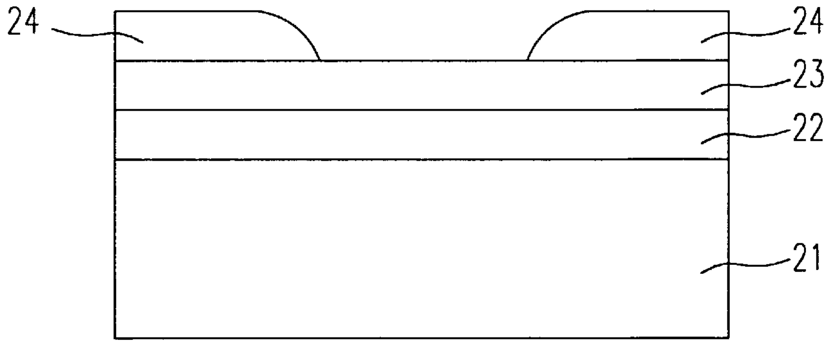
Figure 2D:
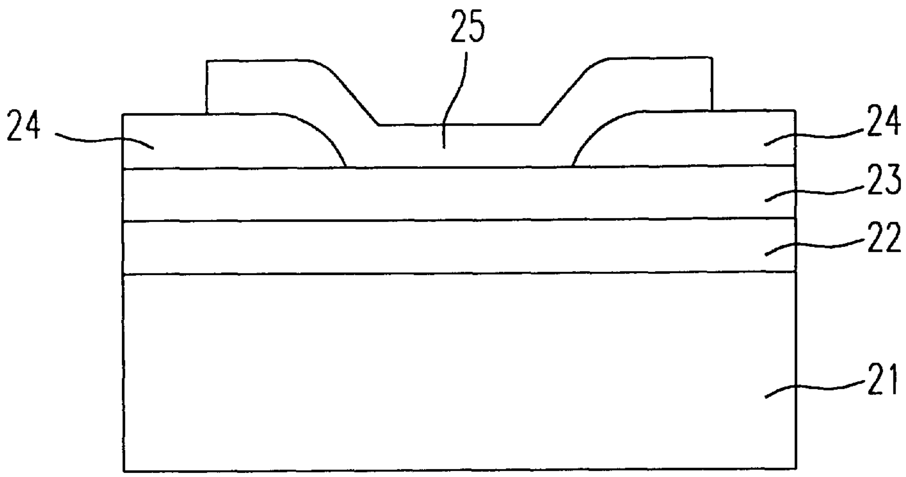
Figure 2E:
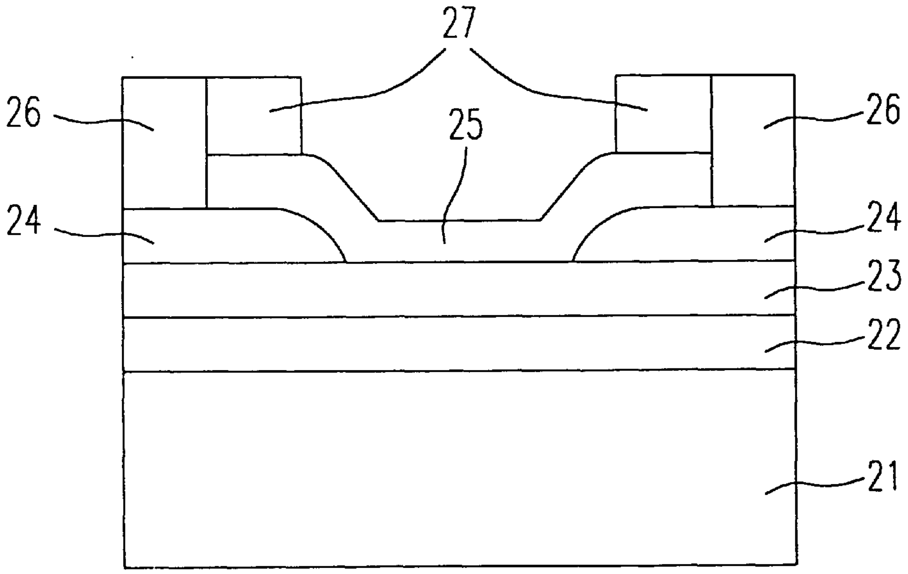
Figure 2F:
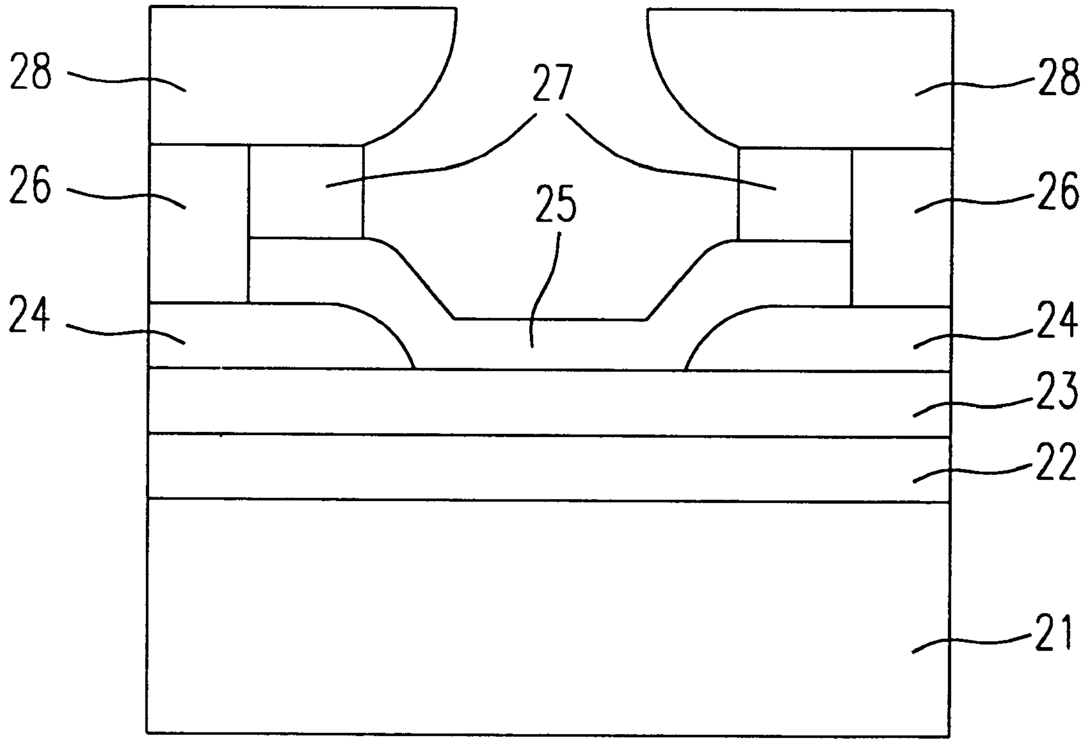

Please refer to FIG. 2(*a*)~(*f*) showing a preferred embodiment of the process for manufacturing an ink jet printhead according to the present invention. The detailed manufacturing processes are described as follows.

In FIG. 2(*a*), a dielectric layer 22 is formed over a silicon substrate 21 by thermal oxidation. The dielectric layer 22 can be a silicon dioxide layer 22.

As shown in FIG. 2(*b*), a resistor 23 is formed over the silicon dioxide layer 22 by direct current (DC) sputtering technique. The resistor 23 can be a tantalum nitride (TaN) layer. Compared with the conventional ink jet printhead, the TaN layer has a lower resistance in comparison with tantalum-aluminum alloy so that the lifetime of the ink jet printhead of the present invention can be extended.

The step shown in FIG. 2(*c*) is to form a conducting layer 24 over a portion of the resistor 23 by sputtering process, photolithography, and etching technique. The conducting layer 24 can be an aluminum metal layer.

In FIG. 2(*d*), a passivation 25 is formed over a portion of the conducting layer 24 and another portion of the resistor 23, not covered by the conducting layer 24, by plasma enhanced chemical vapor deposition (PECVD) or direct current (DC) sputtering technique. The passivation 25 can be a silicon nitride layer 25. If the silicon nitride layer 25 is formed by direct current (DC) sputtering technique, it can prevent from generating any toxic gas during the manufacturing process of the present invention. Moreover, if the silicon nitride layer 25 is formed by direct current (DC) sputtering technique, the process can be easily completed only by introducing nitrogen gas (N2) therein. Therefore, they greatly improve the process for manufacturing the ink jet printhead.

As shown in FIG. 2(*e*), a metal layer 26 is formed over another portion of the conducting layer 24 not covered by the passivation 25 by sputtering process. The metal layer 26 is a gold (Au) metal layer. Thereafter, a photoresist 27 is formed over a portion of the passivation for forming a hole to store ink therein.

In FIG. 2(*f*), a nozzle plate 28 is attached to the photoresist 27 for providing at least a nozzle to eject therethrough the ink.

In a preferred embodiment of the process of the present invention (not shown), the resistor 23 can be doped through a doping drive-in procedure to form a doping resistor layer. The doping drive-in procedure can be executed by diffusion method or ion implantation. The resistor 23 is a tantalum nitride (TaN) layer 23. The doping drive-in procedure uses an element with an atomic radius which is 10~30% of that of tantalum as a dopant source. Preferably, the doping resistor layer can be a metal layer containing tantalum (Ta), indium (In), lead (Pb), praseodymium (Pr), or samarium (Sm). Other steps for maufacturing the ink jet printhead of the present invention are the same as those described above.

Figure 3A:
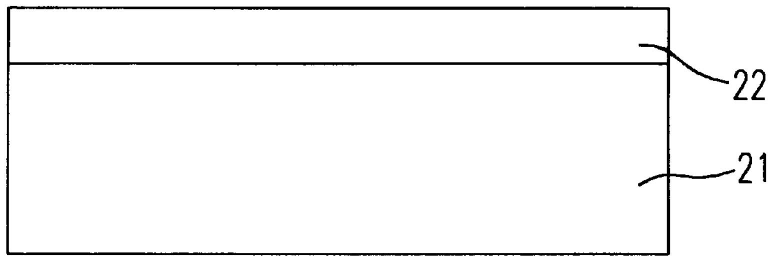
FIG. 3(*a*)~(*e*) are schematic diagrams showing another preferred embodiment of the processes for forming a resistor of the ink jet printhead according to the present invention.
Figure 3B:
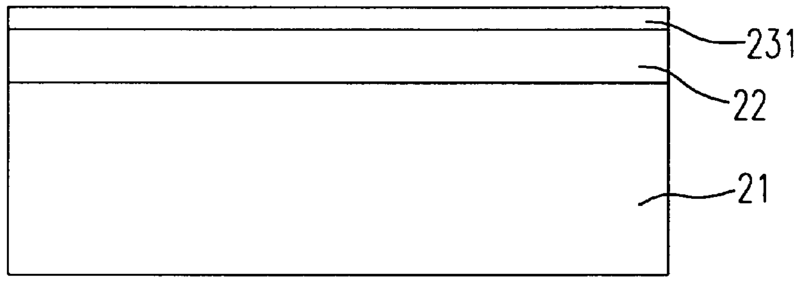
Figure 3C:
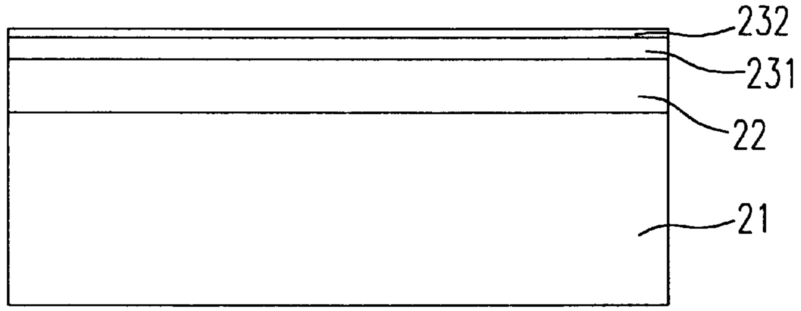
Figure 3D:
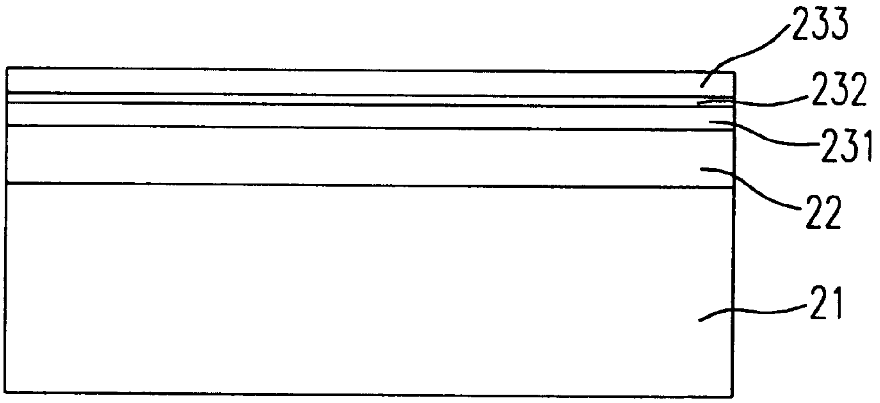
Figure 3E:
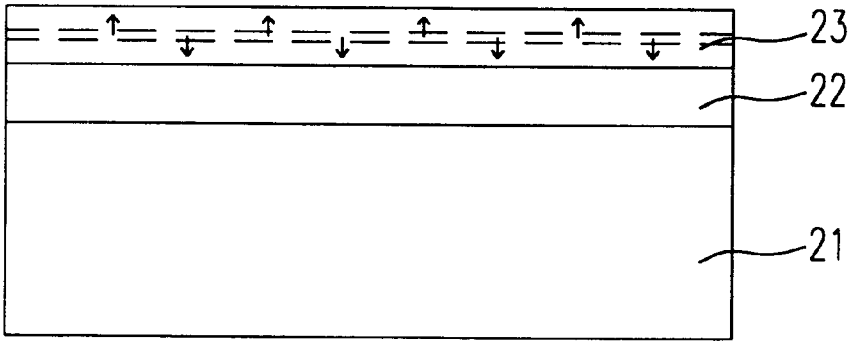

In another preferred embodiment of the process of the present invention, a dielectric layer 22 is formed over a silicon substrate 21 by thermal oxidation and a resistor 23 is formed by processes as shown in FIG. 3(*a*)~(*e*). First of all, a first resistor 231 is formed over the dielectric layer 22 by direct current (DC) sputtering technique, wherein the first resistor 231 is a tantalum nitride (TaN) layer. Thereafter, a doping layer 232 is formed over the first resistor 231 by direct current (DC) sputtering technique. The doping layer 232 is doped by an element with an atomic radius which is 10~30% of that of tantalum. Preferably, the doping layer 232 can be a metal layer containing indium (In), lead (Pb), praseodymium (Pr), or samarium (Sm). Thenceforth, a second resistor 233 is formed over the doping layer 232 by direct current (DC) sputtering technique. The second resistor 233 can be a tantalum nitride (TaN) layer. Finally, the resistor 23 can be obtained after the doping layer 232 is diffused to the first and second resistors 231 and 233 through a rapid thermal process (RTP). The following steps for completely manufacturing the ink jet printhead of the present invention are the same as those described above.

The present invention provides a rapid process for manufacturing the ink jet printhead. The resistor 23 can be effectively free from phenomenon of electron migration so that the resistor will not be damaged due to a long overheating time and the useful lifetime of the ink jet printhead can be elongated.

In conclusion, the present invention provides an improved manufacturing process and structure of an ink jet printhead with high quality, yield rate, and performance to avoid the defects of the conventional process such as uneasy control, generating toxic gas, short useful lifetime and so on.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for manufacturing an ink jet printhead comprising steps of:

providing a substrate;

forming a dielectric layer over said substrate;

forming a resistor over said dielectric layer, forming a doping layer over said resistor doping said resistor by a drive-in procedure using an element with an atomic radius which is 10~30% of that of the tantalum as a dopant source;

forming a conducting layer over a portion of said resistor;

forming a passivation over a portion of said conducting layer and another portion of said resistor not covered by said conducting layer by a direct current (DC) sputtering technique wherein said passivation is a silicon nitride layer;

forming a hole over said passivation for storing an ink; and forming a nozzle over said hole for ejecting therethrough said ink.

2. A process according to claim 1 wherein in said step (b), said dielectric layer is formed by thermal oxidation.

3. A process according to claim 1 wherein in said step (b), said dielectric layer is a silicon dioxide layer.

4. A process according to claim 1 wherein said resistor is a tantalum nitride (TaN) layer.

5. A process according to claim 1 wherein said doping drive-in procedure is selected from the group consisting of diffusion method and ion implantation.

6. A process according to claim 1 wherein said doping resistor layer is a metal layer containing an element selected from a group consisting of tantalum (Ta), indium (In), lead (Pb), praseodymium (Pr), and samarium (Sm).

7. A process according to claim 1 wherein in said step (d), said conducting layer is formed by sputtering process, photolithography, and etching technique.

8. A process according to claim 1 wherein said conducting layer is an aluminum metal layer.

9. A process according to claim 1, further comprising a step after said step (e):

g) forming a metal layer over another portion of said conducting layer not covered by said passivation.

10. A process according to claim 9 wherein said metal layer is a gold (Au) metal layer formed by sputtering process.

11. A process according to claim 1 wherein in said step (f), said hole is defined by forming a photoresist over a portion of said passivation.

12. A process according to claim 1 wherein in said step (g), said nozzle is formed by using a nozzle plate attached to said photoresist.

13. A process for manufacturing an ink jet printhead comprising steps of:

a) providing a substrate;

b) forming a dielectric layer over said substrate;

c) forming a first resistor over said dielectric layer;

d) forming a doping layer over said first resistor;

e) forming a second resistor over said doping layer;

f) forming a resistor layer after said doping layer is diffused to said first and second resistors;

g) forming a conducting layer over a portion of said resistor layer;

h) forming a passivation over a portion of said conducting layer and another portion of said resistor layer not covered by said conducting layer;

i) forming a hole over said passivation for storing an ink; and j) forming a nozzle over said hole for ejecting therethrough said ink.

14. A process according to claim 13 wherein said first resistor is a tantalum nitride (TaN) layer formed by direct current (DC) sputtering technique.

15. A process according to claim 13 wherein said doping layer contains an element with an atomic radius which is 10~30% of that of tantalum.

16. A process according to claim 13 wherein said doping layer is formed by direct current (DC) sputtering technique.

17. A process according to claim 13 wherein said doping layer is a metal layer containing an element selected from a group consisting of indium (In), lead (Pb), praseodymium (Pr), and samarium (Sm).

18. A process according to claim 13 wherein said second resistor is a tantalum nitride (TaN) layer formed by direct current (DC) sputtering technique.

19. A process according to claim 13 wherein in said step (f), said resistor layer is formed through a rapid thermal process (RTP).

* * * * *